United States Patent [19]

Saxon

[11] 4,207,439
[45] Jun. 10, 1980

[54] LINE/INTERFACE CIRCUIT FOR KEY TELEPHONE SYSTEMS

[75] Inventor: Bruce R. Saxon, Harrisburg, Pa.

[73] Assignee: International Telephone and Telegraph Corporation, New York, N.Y.

[21] Appl. No.: 924,273

[22] Filed: Jul. 13, 1978

[51] Int. Cl.$^2$ .......................................... H04M 1/72
[52] U.S. Cl. ........................................... 179/99 LC
[58] Field of Search ............. 179/18 F, 18 FA, 81 R, 179/99

[56] References Cited

U.S. PATENT DOCUMENTS

| | | | |
|---|---|---|---|
| 3,916,118 | 10/1975 | O'Neill | 179/99 |
| 3,925,624 | 12/1975 | Earle et al. | 179/81 R |
| 4,004,106 | 1/1977 | Yachabach et al. | 179/99 |
| 4,039,763 | 8/1977 | Angner et al. | 179/99 |
| 4,079,212 | 3/1978 | Sasai | 179/99 |
| 4,101,740 | 7/1978 | Barsellotti | 179/99 |
| 4,101,741 | 7/1978 | Kunstatter | 179/99 |
| 4,125,749 | 11/1978 | Kinoshita et al. | 179/99 |
| 4,132,870 | 1/1979 | Liu | 179/81 R |
| 4,145,579 | 3/1979 | Angner et al. | 179/99 E |

FOREIGN PATENT DOCUMENTS

| | | | |
|---|---|---|---|
| 44-17170 | 7/1969 | Japan | 179/99 |
| 44-17163 | 7/1969 | Japan | 179/99 |

Primary Examiner—James W. Moffitt
Assistant Examiner—Randall P. Myers
Attorney, Agent, or Firm—John T. O'Halloran; Alfred C. Hill

[57] ABSTRACT

A line/interface circuit for a key telephone system, which system is of the type including a subscriber telephone line manifesting a pair of conductors. The conductors emanate from a central office or PBX and the line/interface circuit provides interconnections between a key subset associated with said subscriber and said central office via said telephone line. The line/interface circuit has optical sensing means for producing a signal indicative of ringing to indicate an incoming call. Means are coupled to the optical sensing means to access the subset with an alternate signal. The subset is coupled for the transmission of voice signals to the telephone lines by means of a transformer to provide isolation. Additional means are provided to enable operation of the subset in a hold condition without releasing a connection between a connected party and the subset. The line circuit provides additional means to enable the subset to initiate a call by accessing the telephone lines, which access is accomplished rapidly with a minimum of interferences in regard to the telephone lines. Due to the nature of the coupling and operation of the line circuit, the line circuit performs all required switching and supervisory functions with a minimum of interference to the telephone lines, thus avoiding the use of an interface.

13 Claims, 1 Drawing Figure

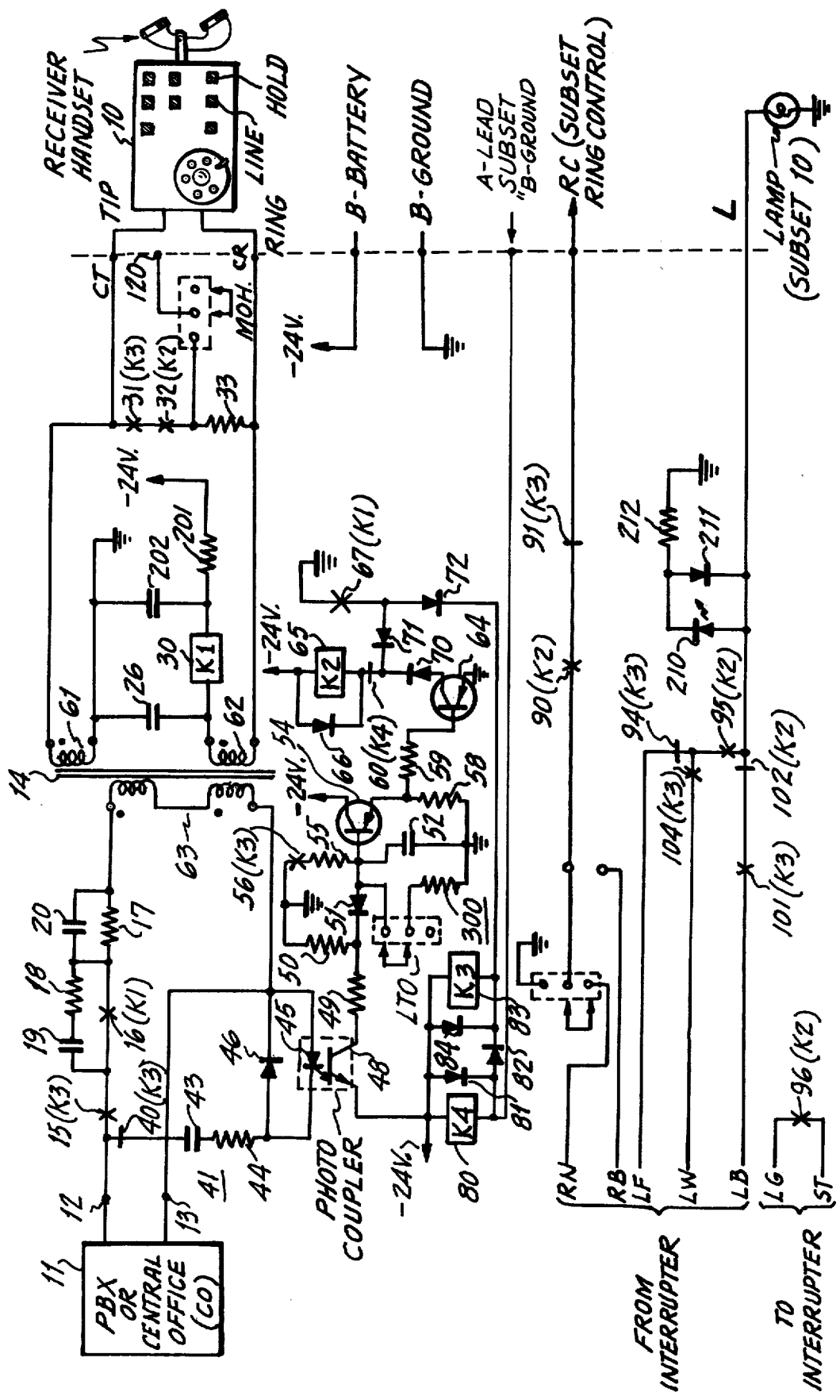

LINE/INTERFACE CIRCUIT FOR KEY TELEPHONE SYSTEMS

BACKGROUND OF INVENTION

This invention relates to telephone systems in general and more particularly to a line/interface circuit for use in a key telephone system.

When a given location, such as a business or office, has more than one line from the central office (CO) or from a private branch exchange (PBX) and a plurality of telephone stations, it is often desirable to equip the location with key sets to provide local switching functions and other desirable features. These features include:

(1) ability to pickup one or more of several central office lines;
(2) ability to hold one or more lines and use another line;
(3) ability to signal an associate;
(4) ability to have local intercommunication.

As can be readily ascertained, a wide variety of instruments are available for such uses ranging from a single line desk set to large ten, eighteen, twenty, thirty and more button sets or consoles. Audible and visual signals are required if there is more than one line and multiple access thereto. The audible signals are similar to central office ringing supply, while the visual devices comprise small lamps located under plastic key caps.

In order to employ such telephone key sets, a line circuit configuration is generally used to provide station control of line pickup and hold functions in such systems. Many suitable configurations exist in the prior art and have been available from various companies. As such, various United States patents show line circuits which may be employed in such systems and which provide various advantages.

For example, U.S. Pat. No. 4,013,844, entitled LINE CIRCUIT FOR A UNIVERSAL KEY/INTERNAL TELEPHONE SYSTEM, issued on Mar. 22, 1977 to B. Ronald Saxon and assigned to the Assignee herein, shows a balanced line circuit which operates from compatible power supplies found in conventional key service units. Other patents as U.S. Pat. Nos. 3,647,983, 3,941,943, and 4,075,434 show various line circuits which include different features to implement various operating modes.

A major problem in regard to conventional line circuits is the requirement that all such devices originate in telephone company provided equipment. Such equipment is sometimes designated as interface equipment and is installed and maintained by the telephone carrier. In the United States and elsewhere, FCC tariffs do not permit the direct connection of many prior art line circuits to telephone company facilities. Accordingly, the operating telephone company provides the interfaces to protect their facilities against hazardous voltages, imbalances, excessive signal levels and so on. The cost of these interfaces are added to the telephone bill and paid for by the consumer.

It is therefore desirable to provide a line circuit which will interface with a conventional telephone line, while providing complete isolation and hence, preventing the above described problems from occurring. Accordingly, the circuit to be described can be coupled directly to a telephone line and eliminate the need for the inclusion of an interface circuit.

BRIEF DESCRIPTION OF PREFERRED EMBODIMENT

A line/interface circuit for a key telephone system of the type including a subscriber telephone line manifesting a pair of conductors emanating from a central office to provide interconnections between a key subset associated with said subscriber and said central office via said telephone line, said line/interface circuit comprising detector means responsive to AC ringing signals on said telephone line, said detector means including a current conducting path selectively coupled between said lines, said path including light emitting means responsive to said current indicative of ringing signals to provide an optical signal according to said ringing signal, means coupled to said light emitting means for providing an electrical control signal indicative of said ringing signal, and logic means responsive to said control signal for initiating an alternate signal at said subset indicative of the detection of said ringing signal.

BRIEF DESCRIPTION OF THE DRAWING

The sole FIGURE is a partial block and schematic diagram of a line/interface circuit for a key telephone system according to this invention.

DETAILED DESCRIPTION OF THE INVENTION

Referring to the FIGURE there is shown a partial block and schematic drawing of an interface/line circuit according to this invention.

A subscriber key set 10 is coupled via a line circuit to the incoming lines of a central office or PBX location 11. The subset 10 is shown in a pictorial manner and it is understood that any subset as presently employed in key telephone systems could be used.

As can be seen from the FIGURE, line circuit performs coupling of the telephone subset 10 to the telephone lines associated with the central office 11. The line circuit has two input terminals 12 and 13 which are connected directly to the incoming telephone line 11.

The terminals 12 and 13 are coupled to secondary 63 of a transformer 14 through a series circuit consisting of normally opened relay contacts 15 and 16 and a resistor 17. As will be explained, the relay contact 16 is shunted by a series resistor capacitor consisting of resistor 18 and capacitor 19. The resistor 17 in series with the secondary winding 63 of transformer 14 is shunted by a capacitor 20.

One terminal of primary 61 of transformer 14 is connected directly to the output terminal CT (TIP) associated with the telephone set 10. One terminal of winding 62 is coupled directly to terminal CR (RING). The remaining terminal of winding 61 is connected to ground and, via capacitor 26, it is also connected to the remaining terminal of winding 62.

In this manner, the transformer 14 completely isolates the telephone company lines from the internal key system circuits and also provides subset 10 circuit balance.

Varistors that are part of the telephone subset side tone circuit serve to limit the voice signal power that can be transmitted to the telephone line to thus assure that signal levels are not exceeded. The varistors are not shown in the FIGURE but function as indicated.

A relay coil 30 designated as K1 has one terminal coupled to a source of potential that is filtered from the B battery supply. The other terminal is coupled to the junction of transformer winding 62 and capacitor 26.

The junction between capacitor 26 and winding 61 is coupled to a source of reference potential or the ground. As will be further explained, the above described series circuit enables off-hook operation of the subset 10.

Also shown in shunt with terminals CT and CR is a series connection consisting of normally opened contacts 31 and 32 in series with a resistor 33. As will be explained, this circuit provides a tip/ring holding current during subsequent operation.

As is known, most line circuits operate to detect AC ring, which signal is sent from the central office when a call is completed to a called number. The line circuit includes a ring detector which appears in shunt with terminals 12 and 13 connected to the telephone line emanating from the central office 11. The ring detector includes a normally closed contact 40 in series with a circuit 41 consisting of resistor 44 and a series capacitor 43.

The resistor 44 is connected to the cathode of an LED diode 45. The anode of diode 45 is connected directly to terminal 13. The LED diode 45 is shunted by a diode 46 having its anode connected to the cathode of diode 45 and its cathode connected to the anode of diode 45. The LED or light emitting diode 45 is optically coupled to the base electrode of a phototransistor 48.

The emitter electrode of transistor 48 is coupled to a source of operating potential, while the collector electrode is coupled to ground through a series path consisting of resistors 49 and 50. The junction between resistors 49 and 50 is coupled to the cathode of a diode 51. The diode 51 has its anode coupled to ground through a filter capacitor 52 and coupled to the base electrode of a transistor 54.

The base electrode of transistor 54 is coupled to ground via a resistor 55 in series with a relay contact 56. The collector electrode of transistor 54 is coupled to a source of operating potential designated as the B battery (−24 volts). The emitter electrode of transistor 54 is coupled to ground through resistor 58. The junction between the emitter electrode of transistor 54 and resistor 58 is coupled to the base electrode of transistor 64 via resistor 59. The emitter electrode of transistor 64 is connected to ground.

The collector electrode of transistor 64 is coupled to the B battery via diode 70, contact 60 (K4), and relay coil 65 (K2). Coil 65 is shunted by a diode operative to reduce transients when the coil is deactivated.

As seen from the FIGURE, the anode of diode 70 is coupled to the collector electrode of transistor 64, while the cathode of diode 70 is coupled to one terminal of contact 60. The junction between contact 60 and the cathode of diode 70 is coupled to the cathode of a diode 71. The anode of diode 71 is coupled to one terminal of a normally opened contact 67. The other terminal of contact 67 is coupled to ground. The anode of diode 71 is also coupled to the anode of a diode 72 having its cathode coupled to the "A" lead via a diode 82. The diode 82 has its cathode connected to the cathode of diode 72 with its anode coupled to the "A" lead. The "A" lead emanates from the subset 10. Also shown coupled to this "A" lead is one terminal of a relay coil 80 (K4). The other terminal of the coil 80 is coupled to the source of operating potential.

A diode 81 is in shunt with the coil 80 and serves to reduce or limit transients when the coil is deactivated. The diode 81 has its cathode coupled to the anode of diode 82. A further coil 83 (K3) has one terminal coupled to the cathode of diode 82 and its other terminal coupled to the source of operating potential. A transient suppressant diode 84 also appears in shunt with coil 83 (K3).

As briefly indicated above, the "A" lead emanates from the subset 10 and is a conventional designation and the operation of the lead will be described in the following sequence of operation and exhibits transitions thereon which are known to those skilled in the art.

A series of selectable signal leads as RN, LF, LW, LB, LG and ST are also shown on the FIGURE and as will be explained, provide signal inputs and visual control to the subset 10 for ringing and lamp control.

The above description is afforded to show the main connections indicated in the FIGURE and to describe the function of certain components which are included in the line circuit. In order to gain a clear understanding of the operation of the circuit, the following operating conditions will be described:

INCOMING CALL

For present purposes, assume that the subset 10 is receiving a call from the central office. The subset 10 is on-hook and is therefore capable of being accessed.

When the central office has accessed lines 12 and 13 via the switching matrixes associated with the central office, an AC ringing voltage appears across terminals 12 and 13. This AC ringing voltage causes current to flow via contact 40, capacitor 43, series resistor 44 and through the LED diode 45. As one can ascertain, this current path occurs during the negative portion of the AC ringing voltage. During the positive portion, the diode 46 conducts and protects diode 45 during the reverse cycle of the AC ringing voltage.

Contact 40 and contact 15 are operated by the same relay which is relay 83 (K3) associated with the "A" lead. Hence, each contact as 15 and 40 has the term K3 in parentheses. Contact 15 prevents the ringing signal from being applied to the secondary of the isolation transformer 14.

During the negative cycle of the ringing voltage, the phototransistor 48 is activated by the LED diode 45 which is optically coupled to its base electrode. The conduction of transistor 48 causes the B battery voltage to appear at its collector electrode. Resistors 49 and 50 serve as a voltage divider and the voltage at the junction of resistors 49 and 50 is coupled via diode 51 to capacitor 52. The capacitor 52 charges to the divided voltage during the negative half-cyles of the ringing signal. During the positive half-cycle of the ringing signal, the capacitor 52 discharges through the base to emitter junction of the emitter follower configuration including transistor 54. The emitter load of transistor 54 consists of the resistor 58.

During the ringing signal, the voltage level developed across capacitor 52 is amplified by transistor 54. Transistor 54 then applies a forward bias to the base of transistor 64 via resistor 59.

The negative voltage at the base electrode of transistor 64 causes it to conduct. Transistor 64 conducts and operates relay coil 65 (K2) via diode 70 and the normally closed contact 60 (K4).

Upon operation of K2, contact 90 closes. This now connects the interrupted ringing signal lead (RN) to the ring lead (RC) associated with the subset. Contact 90 is in series with contact 91 which is associated with the relay 83 (K3) as are contacts 15 and 40 above described.

In this manner, the ringing signal RN is supplied to the subset on lead RC and the subset commences to ring. Upon the activation of relay K2, the lamp flash voltage LF is connected to the lamp lead L via contact 94 associated with relay K3 and contact 95 associated with relay K2. Contact 95 is now closed due to the operation of relay K2. The lamp associated with subset 10 now receives a flashing signal which causes the lamp to flash on and off while the subset is ringing.

Also shown is contact 96 which is also closed upon activation of relay K2. The closing of contact 96 connects the LG lead to the ST lead which starts the key system interrupter in operation. Interrupters are well known and need not be described in detail for the present purposes. Basically, an interrupter includes a motor which drives a series of cams. The cams can operate various contacts during rotation and the operation of such contacts provides the desired interruptions in signals as applied to the various lamps and audible ring circuits. These interruptions provide the proper ringing frequencies in regard to on and off time as well as the proper flashing frequencies for energizing the lamp and ringing signals in each of the subsets.

Thus, as described above, upon receipt of a ringing signal from a central office, the line circuit detects the ringing and provides a ringing tone to the subset and a flashing of the subset lamp. The line set activates the key system interrupter to enable the proper intervals to be provided for both the ringing frequency and the flashing frequency as supplied to the subset.

As above described, the telephone 10 will continue to ring and the lamp will continue to flash until the call is answered or the ringing signal from the central office is removed.

CALLED PARTY ANSWERS

When the call is answered, the party lifts the receiver handset associated with the subset 10. As soon as the receiver is off-hook, current can now flow through the subset to complete a DC path. Current now flows from ground through the transformer 14 winding 61, through the subset, through transformer 14 winding 62, and thence through relay coil 30 (K1) and resistor 201 to the battery voltage. Relay 30 (K1) activates. Contact 67 which is associated with relay 30 now places a ground at the anodes of diodes 71 and 72 to provide holding paths for relays 65 (K2) and 83 (K3) during the "hold" function described later.

The "A" lead is at ground, which places a ground on relay coil 80 (K4) causing it to activate. A ground is also placed on relay coil 83 (K3) via diode 82 causing it to operate. The operation of relay 80 (K4) causes contact 60 to interrupt the current flow to relay coil 65 (K2) thereby deactivating relay 65 (K2). Upon activation of relay 83 (K3), contact 91 (K3) is opened which thus removes the ringing signal from the subset lead RC. Contact 56 (K3) closes, which rapidly discharges capacitor 52 to ground via resistor 55.

A contact 101 (K3) connects the lamp battery lead LB to the subset lamp via the contact 102 (K2) which is now closed due to the deactivation of relay 65 (K2). Hence, the LB lead supplies battery voltage to the lamp associated with the subset when the called party answers, thus providing a steady visual signal. Contact 95 (K2) opens thereby removing the lamp flash signal from the subset lamp.

Upon activation of relay K1, contact 16 (K1) closes. Upon activation of relay K3, contact 15 (K3) closes and contact 40 (K3) opens. Hence, the secondary of transformer 14 is connected directly to terminal 12 via contacts 15 and 16 upon the operation of relays 30 (K1) and 83 (K3). This completes a DC path which trips ringing at the central location.

Contact 40 (K3) is now open and the ringing detector which includes the optical coupling device is removed from the circuit. The DC supplied by the central office now flows from terminal 12 via contacts 15 (K3) and 16 (K1), resistor 17, through transformer 14 winding 63 into terminal 13. Capacitor 20 provides an AC bypass across resistor 17. Resistor 18 and capacitor 19, across contact 16 (K1), provide noise suppression during dialing. The voice signals from the called party at subset 10 are coupled to transformer 14. Capacitor 26 provides a virtual AC ground at the center between transformer 14 windings 61 and 62 for providing balance at the subset terminals.

SUBSET ON HOLD

Assume now that the called party has answered the call as above described and now depresses the hold button associated with the subset. It is noted that the hold button operation is conventional and well defined in key telephone subsets. Depression of the hold button associated with the subset 10 causes the "A" lead to be opened, thus removing the ground from relay coil 80 (K4). The depression of the hold button causes the removal of the ground before the CT and CR path is interrupted through the subset and hence, the connection between the called and calling party is still maintained.

As soon as the "A" lead is opened, relay 80 (K4) is deactivated which re-establishes a current path to relay 65 (K2). Relay 65 (K2) is now operated via contact 60 (K4) and diode 71. Relay 83 (K3) is already operated and stays operated due to the fact that contact 67 (K1) provides a current path via diode 72. The diode 82 blocks this path, thus allowing relay 80 (K4) to remain deactivated.

Accordingly, contact 31 of K3 and contact 32 of K2 are closed to provide the tip/ring current via resistor 33 across terminals CT and CR of the subset 10. This maintains the operation of relay 30 (K1) which as above described, maintains contact 67 operated to provide the holding paths for relays 65 (K2) and 83 (K3) via diodes 71 and 72 respectively.

The LW lead or light winking signal is applied to the subset lamp via contact 104 (K3) closing upon operation of relay 83 (K3) and via contact 95 (K2) closing, upon operation of relay 65 (K2). Hence, the lamp winks on and off when the hold button is depressed. Lamp battery is removed via operated contact 102 (K2).

When the line button is again depressed to eliminate the hold condition, the "A" lead returns to ground and relay 65 (K2) is deactivated via contact 60 (K4) when relay 80 (K4) is operated again due to the "A" lead ground. The LB or lamp battery voltage is again supplied to the subset lamp via contact 101 (K3) and the normally closed contact 102 (K2). Contact 32 (K2) is again opened and the subset being connected to the line provides the tip/ring current path via the line switch contacts.

SUBSET INITIATES A CALL

To initiate a call, the subscriber lifts the receiver of subset 10 "off-hook" and depresses a desired line button. The "A" lead goes to ground and hence, there is a ground at relay coil 80 (K4) and relay coil 83 (K3). This ground causes the operation of relays 80 and 83. Because of the operation of contact 60 (K4), relay 65 (K2) does not operate. When relay 83 (K3) operates, lamp battery (LB) is applied to the subset lamp via contacts 101 (K3) and 102 (K2).

Contact 15 (K3) is closed and contact 40 (K3) is opened and the ring detector is removed. Due to the fact that the subset is "off-set" and the line button is depressed, the CT and CR path is closed and current flows from ground through transformer 14, winding 61, through the subset, through transformer 14, winding 62, relay coil 30 (K1) and resistor 201 to the battery. Relay 30 (K1) is operated, thus closing contact 16 (K1) to complete the DC path to the central office 11 and hence, to initiate a service request. The central office or PBX 11 then provides a dial tone to subset 10 via the connection.

Contact 67 (K1) provides an operating path via diode 72, to maintain relay 83 (K3) operating when the subset "A" lead is interrupted during a depression of the hold button.

Upon receipt of dial tone, the subscriber commences dialing. If dialing is accomplished by ordinary means, the dial pulses are generated by pulsing the tip/ring current on and off as controlled by the dial pulse contacts. Relay 30 (K1) follows the dial pulses and opens and closes accordingly. Hence, contact 16 (K1) in the secondary side of transformer 14 pulses on and off according to dial pulses and therefore the central office current is interrupted according to the operation of contact 16 (K1). When dialing is completed, the central office or PBX 11 completes the connection if the called line is not busy.

If the subset 10 is equipped with touch tone dialing, the tones are coupled directly to the central office 11 via transformer 14.

As described above, there is provided a line and interface circuit for a key telephone system. The circuit enables coupling directly to a central office or PBX line with a minimum of interference. Ringing is detected by means of a photo-coupled ring detector which provides extreme isolation and which is removed from the line upon an answer by the called party.

The line circuit described provides additional functions and features as will be apparent to those skilled in the art. For example, music can be provided when the subset is placed in a hold condition. In this manner, a source of music can be connected to terminal 120 adjacent resistor 33. The jumper MOH is moved to connect the music source 120 to the junction of resistor 33 and contact 32. As above described, during the hold condition contacts 31 and 32 are energized or closed and hence, the source 120 is connected to transformer 14 and thus the music source is coupled to the telephone line to allow the party at the other end to listen to the music when subset 10 is in the hold condition.

Also shown in the FIGURE is a filtered power supply for operation of the subset 10 tip and ring circuit. The filtered power supply is derived from the B battery (−24 V) via resistor 201 and capacitor 202. The capacitor 202 is employed as a filter capacitor.

Also shown connected to the lamp lead L is an LED (light emitting diode) 210. Diode 210 is activated when battery is supplied to the subset lamp. The diode 210 enables service personnel to check the status of the line during system operation and hence, serves as a visual busy indicator. A semiconductor diode 211 is in shunt with diode 210 to protect the same and resistor 212 is used to limit the current drawn by the diodes 210 and 211.

Also shown in the FIGURE is a resistor 300. The resistor 300 can be connected via the LTO jumper to shunt the junction between capacitor 52 and the anode of diode 51. In this manner, resistor 300 affords a faster discharge time for capacitor 52. This may be necessary to provide a more rapid release of the circuit in the event the subscriber of subset 10 does not answer his telephone when ringing is sent. As is well known, the central office will remove ringing when the calling party hangs up or may remove ringing after a predetermined time if the called party does not answer. In this event, capacitor 52 will discharge and relay 65 (K2) is deactivated.

A key system interface/line card successfully operated in a key telephone system employs the following components by way of example. It is understood that one skilled in the art can substitute equivalent values and components without departing from the function and operation provided.

| RESISTIVE COMPONENTS | VALUE |
| --- | --- |
| Resistor 17 | 220 ohms |
| Resistor 18 | 100 ohms |
| Resistor 33 | 150 ohms |
| Resistor 44 | 22 Kilohms |
| Resistor 49 | 47 Kilohms |
| Resistor 50 | 47 Kilohms |
| Resistor 55 | 1,000 ohms |
| Resistor 58 | 82 Kilohms |
| Resistor 59 | 47 Kilohms |
| Resistor 201 | 390 ohms |
| Resistor 212 | 1.0 Kilohms |
| Resistor 300 | 3.3 Megohms |
| CAPACITIVE COMPONENTS | VALUE |
| Capacitor 19 | 0.1 Mfd. |
| Capacitor 20 | 2.2 Mfd. |
| Capacitor 26 | 2.2 Mfd. |
| Capacitor 43 | .47 Mfd. |
| Capacitor 52 | 2.2 Mfd. |
| Capacitor 202 | 220 Mfd. |
| Transistors 54,64 | MPS 3645 or equivalent |
| Diodes 46,51,66,70,71, 72,81,82,84,211 | 500 ma, 600PRV |
| Relay K1 (30) | 2 FORM A - 200 ohms coil |
| Relay K2 (65) | 4 FORM C - 590 ohms coil |
| Relay K3 (83) | 6 FORM C - 915 ohms coil |
| Relay K4 (80) | −1 FORM B - 3050 ohms coil |
| Photo Coupler 48,45 | 4N27 |
| B battery | −24 volts |

Although the above components are given by way of example, it should be clear to one skilled in the art that the function of the transistors, diodes and relay contacts can be implemented by the use of logic circuit modules such as AND gates, OR gates and similar devices which will operate during the presence of one or more logic conditions. In this manner, the above described circuitry performs such logic by employing the components and circuitry above described.

What is claimed is:

1. A line/interface circuit for use with a telephone system including at least one key telephone subset having a plurality of access keys for interconnection of said subset to a telephone system by a pair of conductor lines emanating from said system, said line/interface circuit comprising:

transformer means having first and second windings, said first winding being coupled to said subset and said second winding being selectively coupled to said conductor lines, detector means selectively coupled to said second winding and operative in a first mode to detect the presence of a ringing signal on said lines, and to provide a control signal indicative of the presence of said ringing signal, logic means responsive to said control signal for applying an alternate signal to said subset indicative of said ringing signal, first means coupled to said first winding and operative upon operation of said subset in response to said alternate signal to provide a first current conducting path through said subset, said path including first switching means, and a second switching means coupled to said first means, said first and second switching means being operative by said first means to selectively DC connect said conductor lines to said second winding, said second switching means removing said detector means from said second winding when said second winding is DC connected to said conductor lines.

2. The line/interface circuit according to claim 1 wherein said subset is activated with an audible signal indicative of said detected ringing signal.

3. The line/interface circuit according to claim 1 wherein said subset is activated with a visual signal indicative of said detected ringing signal.

4. The line/interface circuit according to claim 1 further comprising means responsive to said alternate signal being initiated for providing a busy signal indicative of said subset being accessed.

5. The line/interface circuit according to claim 1 wherein said detector means comprises photo-coupler means having a light emitting diode selectively coupled across said lines to provide a light output indicative of said ring signal, a phototransistor having a control electrode optically coupled to said light emitting diode for varying the impedance between first and second output electrodes associated with said phototransistor, and impedance means coupled to one of said output electrodes to provide said control signal indicative of said ringing signal.

6. The line/interface circuit according to claim 5 wherein said logic means responsive to said control signal comprises a half wave rectifier circuit having an input coupled to said control signal and an output for providing a DC level in accordance with said control signal, and second means responsive to said DC level for applying said alternate signal to said subset.

7. The line/interface circuit according to claim 6 wherein said second means includes a transistor having a base electrode responsive to said DC level from said rectifier and having a relay coil as another electrode load and means coupled to said another electrode of said transistor to prevent operation of said coil when said subset is busy, whereby said coil is operated during the presence of said control signal when said subset is in a condition to receive ringing.

8. The line/interface circuit according to claim 7 including further means coupled to said another electrode of said transistor and operative to operate said coil and therefore said relay during said holding mode.

9. The line/interface circuit according to claim 7 including additional means coupled to said another electrode of said transistor and operative to prevent operation of said coil when said subset is in direction communication with said telephone system and during the absence of said holding mode.

10. The line/interface circuit according to claim 1 further comprising:

holding circuit means coupled across said first winding and operative in a hold mode activated by the depression of an access key associated with said subset, said holding circuit means being operative to provide a second current conducting path to maintain said first path and therefore said DC connection when said hold mode is accessed.

11. The line/interface circuit according to claim 10 further comprising means coupled to said holding circuit means to provide music for transmission by said transformer to said conductor lines.

12. The line/interface circuit according to claim 10 further including means responsive to said hold mode being accessed to provide an indication of said hold condition at said subset.

13. The line/interface circuit according to claim 11, wherein said subset is activated with an audible signal and a visual signal indicative of said detected ringing signal.

* * * * *